United States Patent
Cherdo et al.

(10) Patent No.: US 12,161,896 B2
(45) Date of Patent: Dec. 10, 2024

(54) CLAMP DEVICE FOR ATTACHING UP TO THREE HARNESSES TO A PANEL

(71) Applicant: HELLERMANNTYTON S.A.S., Trappes (FR)

(72) Inventors: Pascal M. Cherdo, Beynes (FR); Thomas M. Pizon, Magny-les-Hameaux (FR)

(73) Assignee: HellermannTyton S.A.S., Trappes (FR)

( * ) Notice: Subject to any disclaimer, the term of this patent is extended or adjusted under 35 U.S.C. 154(b) by 28 days.

(21) Appl. No.: 18/166,664

(22) Filed: Feb. 9, 2023

(65) Prior Publication Data
US 2023/0256274 A1  Aug. 17, 2023

(30) Foreign Application Priority Data
Feb. 11, 2022  (EP) .................................... 22305157

(51) Int. Cl.
- *H02G 3/32* (2006.01)
- *A62B 35/00* (2006.01)
- *F16B 2/22* (2006.01)

(52) U.S. Cl.
CPC ............ *A62B 35/0037* (2013.01); *F16B 2/22* (2013.01); *H02G 3/32* (2013.01)

(58) Field of Classification Search
CPC .... B60R 16/0215; H02G 3/32; A62B 35/0037
See application file for complete search history.

(56) References Cited

U.S. PATENT DOCUMENTS

| | | | |
|---|---|---|---|
| 9,004,417 B2 | 4/2015 | Elsner et al. | |
| 10,096,934 B1* | 10/2018 | Desjardins | ......... H01R 13/5841 |
| 10,663,089 B2* | 5/2020 | Sylvester | ................ F16L 3/137 |
| 11,015,742 B2* | 5/2021 | Locatelli | ................. H02G 3/32 |
| 2002/0071715 A1 | 6/2002 | Geiger | |

(Continued)

FOREIGN PATENT DOCUMENTS

| | | |
|---|---|---|
| DE | 102008059360 | 6/2010 |
| EP | 1921362 | 5/2008 |

(Continued)

OTHER PUBLICATIONS

"Automotive edge mounting cable clips 082047001", Retrieved at: https://anemo.eu/automotive/082047001—on Jan. 17, 2023, 7 pages.

(Continued)

*Primary Examiner* — Robert Sandy
(74) *Attorney, Agent, or Firm* — Colby Nipper PLLC (57) ABSTRACT

Disclosed are clamp devices for attaching harnesses to a panel. In aspects, a disclosed clamp device includes a body portion having a fixing portion on a fixing side of the clamp device, arranged to be fixed to a panel, the body portion further has three support sides having a top side opposite to the fixing side, a first lateral side and a second lateral side; and a set of three apertured heads having a first apertured head on the first lateral side, a second apertured head on the second lateral side, and a third apertured head on the top side, each of the apertured heads including a cap and two pillars, the cap and two pillars arranged to create a space between the body portion, the cap, and the pillars to receive a respective cable tie arranged to attach one respective harness to the panel.

21 Claims, 5 Drawing Sheets

(56) References Cited

U.S. PATENT DOCUMENTS

2006/0169482 A1* 8/2006 Hess .................. H02G 3/32
                                                          174/135
2019/0293209 A1* 9/2019 Locatelli ............ B60R 16/0215
2020/0208662 A1* 7/2020 Spearing ................ F16B 5/121

FOREIGN PATENT DOCUMENTS

EP      2371046        1/2018
WO      2013044063     3/2023

OTHER PUBLICATIONS

"Edge Clips", Retrieved at: https://wkk-automotive.com/en/fixation-clips/edge-clips/—on Jan. 17, 2023, 3 pages.

"Extended European Search Report", EP Application No. 22305157.4, Jul. 18, 2022, 10 pages.

"Fastening Systems Product Catalog", Retrieved at: https://www.araymond-automotive.com/sites/default/files/medias/document/2021/ARaymond_Product-Catalog_2021_EN.pdf—on Jan. 17, 2023, 576 pages.

"WKK Automotive Catalogue", Retrieved at: https://wkk-automotive.com/wp-content/uploads/2019/04/Catalogue-WKK-Automotive.pdf—on Jan. 17, 2023, 5 pages.

* cited by examiner

Section view A-A

CLAMP DEVICE FOR ATTACHING UP TO THREE HARNESSES TO A PANEL

INCORPORATION BY REFERENCE

This application claims priority to European Patent Application No. EP22305157.4, filed Feb. 11, 2022, the disclosure of which is incorporated by reference in its entirety.

TECHNICAL FIELD

The present disclosure relates to the field of holding harnesses, cables and the like, for all industries and in particular in the automotive industry and in the aeronautic industry. Such a system can be used for example to safely bundle cables or cables harnesses.

BACKGROUND

The attachment of one or more cables or harnesses with collar bands or cable-ties is known in the art.

The document US2002071715 discloses a double clamping collar comprising two cables ties. However, these swivel joints are relatively complex and expensive to manufacture. Further, there is no possibility in this double clamping collar to increase the number of cables ties to three for example, due to construction constraints.

Therefore there is a need for another kind of clamp device with improved capacities in terms of the number of harnesses to maintain and which is also more precise, quicker and easier to mount onto one or more cables or harnesses, in particular for multiple harnesses attachment in a compact environment. Further, the compact environment may be crowded with more than two harnesses to maintain in different orientations, which is not possible with clamping collars of the prior art.

SUMMARY

In view of the above, the aim of the present disclosure is to attach up to three harnesses to a panel such that the harnesses can be adjustably orientated at different angles to each other.

In a first aspect, the present disclosure thereby concerns a clamp device for attaching up to three harnesses to a panel with cable ties, the clamp device having:
  a body portion having a fixing portion on a fixing side of the clamp device, arranged to be fixed to the panel,
wherein the body portion further has three support sides having a top side opposite to the fixing side, a first lateral side and a second lateral side,
  a set of three apertured heads having a first apertured head on the first lateral side, a second apertured head on the second lateral side and a third apertured head on the top side,
wherein each of the apertured heads has a cap and only two pillars arranged to create a space between the body portion, the cap and the pillars to receive the respective cable tie arranged to attach one respective harness, so that the cable tie is allowed to rotate, thereby allowing up to three harnesses (100) to be adjustably orientated at different angles to each other.

This allows for an improved fixation or attachment of the harnesses in compact environment, in particular when the harnesses are to be maintained in different orientations and in particular when there are three harnesses. Further, this allows for an easier and quicker fixation of the harnesses.

That is, the allowed rotation of the cable tie leads to an easy orientation of the cable tie matching with the corresponding orientation of the harness to be attached. Thereby, the mounting of the clamp device (also called clamping device) is easier and cheaper, but also the mechanical stress on the clamp device, the cable tie and the harness is reduced, while a more firm attachment is provided. Further, it is possible to attach three harness with a simple clamp device, which was not possible with the clamp device of the prior art. This rotative ability enables to fix three harnesses with advantageously angle adaptation on all the desired directions, like a swivel but with reduced cost and improved compactness. This enables to use only one clamp device compared to the prior art, instead of two or more clamp devices. In particular, this is useful when harnesses 100 are close by. That is, when the harnesses are too close to use a conventional clamp device, and/or have different orientations (or very different orientation such as perpendicular directions or misaligned orientations), the clamp device of the present disclosure allows to offer a convenient solution. Still further, this allows to reduce the time it takes to bundle harnesses, to make it easier adapt the orientation, to be more flexible on the location of the clamp device on the panel, to be reliable and to avoid any damage to the cable harness. In addition, this allows to guarantee a very effective holding of harnesses within a minimal space and a very light weight.

A harness may contain and bundle one or more cables. The present clamp device is also suitable for the attachment of multiple cables directly, that is to say cables which are not placed in a harness, and also any combination thereof.

It is referred to a panel. However, the clamp device may by fixed to a wall. Example of a wall is a material layer enclosing space, in e.g. automotive or any other type of industry.

In other words, the disclosure relates to a clamp piece (or a clamp device) for tightening one or more harnesses on a panel, having:
  a fixing portion, on a fixing side of the clamp piece, arranged to be fixed to the panel,
  a set of three apertured heads, comprising a first apertured head arranged on a first lateral side of the clamp piece, a second apertured head arranged on a second lateral side of the clamp piece and a third apertured head arranged on an opposite side opposed to the fixing side, wherein each of the apertured head has a cap and two pillars connected to the cap and arranged to receive a cable tie therebetween.

Advantageously, the second lateral side is opposite to the first lateral side.

This allows for an advantageous orientation of the apertured lateral heads.

Advantageously, the two pillars are arranged to allow the respective cable tie to rotate by 90 degrees, preferably by 90 degrees+/−5 degrees, more preferably by 90 degrees+/−3 degrees, even more preferably by 90 degrees+/−2 degrees.

Advantageously, the two pillars are arranged to allow the respective cable tie to rotate by 90 to 120 degrees, or 90 to 120 degrees or more.

Advantageously, the two pillars are arranged to allow the respective cable tie to rotate by 45 to 90 degrees.

This allows to reduce the time for tightening the one or more harnesses because the adjustment of the clamp device is facilitated by the ability of rotation of the cable tie under the cap. This allows to better adjust the clamp device and the cable ties on the harnesses while improving the correct orientation.

Advantageously, the fixing portion is arranged to receive a metal edge clip.

Advantageously, the fixing portion is arranged to receive a metal edge clip assembled therewith or overmolded thereto.

Advantageously, the fixing portion has an anchor, a threaded portion, a fir tree or a head such as an arrowhead.

This allows for an improved fixing portion.

Advantageously, the cap has a projection projecting toward the fixing portion.

Advantageously, the projection of the cap is a boss, so as to facilitate the rotation of the cable tie below the cap.

This allows to improve the capacity of the cable tie to rotate and adjust under the cap, thereby allowing better rotating adjustment.

Advantageously, the clamp device is integrally formed.

This allows to provide the clamp device as a single piece, ready to be mounted with the cable ties and the harnesses.

Advantageously, a first pillar of the first apertured head is aligned with a first pillar of the second apertured head.

Advantageously, at least one pillar of the first apertured head is aligned with at least one pillar of the second apertured head.

Advantageously, the two pillars of the first apertured head are aligned with the two pillars of the second apertured head.

Advantageously, the pillars are provided at corners of their respective caps.

Advantageously, at least one pillars is provided at corner of its respective cap.

Advantageously, the pillars are arranged at opposite corners of the cap.

Advantageously, the pillars are arranged at opposite corners of the cap and the cap presents a longer surface contact in the direction of the opposite corners.

Advantageously, the surface of the cap arranged to be in contact with the harness is flat or planar.

Advantageously, a second pillar of the first apertured head and a second pillar of the second apertured head are not aligned.

Advantageously, the pillars of the first apertured head and the pillars of the second apertured head are not aligned.

Advantageously, at least one pillar of the first apertured head and at least one pillar of the second apertured head are not aligned, or alternatively placed or in quincunx or with an offset.

This allows to adjust the location of the pillars to more easily adjust the rotation of the cable tie and the attachment of the harnesses, by allowing more combination of the positioning of the pillars. This allows for a more firm attachment while reduction stress, in particular due to the longer surface contact of the cap in the opposite corners direction. That is, closer contact with the harness may be provided and the cap may better follow the surface of the harness by bending around the harness in the perpendicular direction of the opposite corners. That is, the risk of damaging the harness is reduced. Further, the positioning of the pillars enables a simple mould (or mold) design and simplify the molding injection process.

In other words, the pillars of the apertured heads on the laterals sides may have their pillars aligned or not.

Further, the pillars may be placed at other location than at the corners, such as away from the corner.

Advantageously, the pillars are cylindrical or in a columnar shape.

Advantageously, the pillars have a cross section surface which is less than 5% of the surface of the cap, preferably less than 3%, more preferably less than 2%.

This allows to adjust the location and the size of the pillars to more easily adjust the rotation of the cable tie and the attachment of the harnesses, by allowing more combination of the positioning of the pillars.

Advantageously, the fixing portion is arranged to be fixed to the panel directly or indirectly. Advantageously, the fixing portion is arranged to be connected to a fixing device such as a metal edge clip. Alternatively, the fixing portion may comprise directly the fixing device such as mentioned herein (an anchor, a threaded portion, a fir tree or a head such as an arrowhead, and the like).

The cable tie may be a lacing band.

The clamp device may present six sides, namely a fixing side, a top side opposite to the fixing side, two lateral sides (first and second lateral sides) and two through sides, preferably arranged to be longitudinally placed along the panel onto which the clamp device is intended to be fixed.

The clamp device may made out of plastic or any other suitable material. Further, the plastic used can be UV protected for external usage for example the fixing of harness in solar panel construction.

The panel may be a sheet of metal.

Advantageously, the clamp device may further has the metal edge clip assembled with the fixing portion or overmolded onto the fixing portion.

This allows to form an edge clip assembly for an improved fixation onto the panel.

BRIEF DESCRIPTION OF THE DRAWINGS

Other features, purposes and advantages of the disclosure will become more explicit by means of reading the detailed statement of the non-restrictive embodiments made with reference to the accompanying drawings.

DETAILED DESCRIPTION

The present disclosure relates to a clamp device also called a clamping device or clamp piece.

Figure 1:
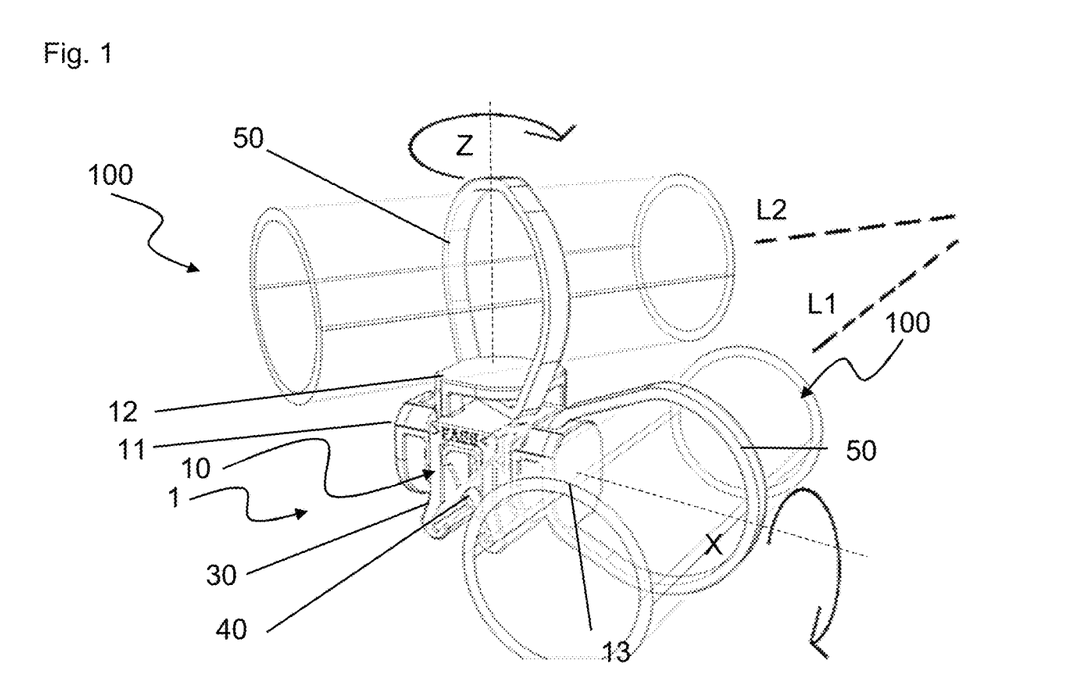
FIG. 1 shows a clamp device according to one embodiment, with cables ties attached to harnesses.

FIG. 1 shows the clamp device 1 according to one embodiment, with cables ties 50 attached to harnesses 100.

The clamp device 1 has a body portion 10 with a fixing portion 30. The fixing portion 30 is arranged to receive a metal edge clip 40.

The body portion 10 supports three apertured heads 11, 12, 13, which are a first apertured head 11, a second aperture head 13 and a third apertured head 12.

The third apertured head 12 is located on a top side, opposite to the fixing side where there is the fixing portion 30, as this will be explained with more details in reference to FIG. 2.

The first apertured head 11 is located on the other side compared to the second apertured head 13, and are on lateral sides.

The apertured heads 11, 12, 13 are arranged to each receive thereunder a portion of a cable tie 50, as this will be explained with more details here after.

The cable ties 50 may be attached to harnesses 100 so as to fix them on the clamp device 1. The clamp device 1 is intended to be fixed on a panel 200 (illustrated in FIG. 3) by the fixing portion 30, via the metal edge clip 40. In this manner, the harnesses 100 can be fixed securely. In particular, the clamp device 1 can be fixed on the panel 200 so that lateral harnesses 100 can be fixed on the sides of the panel 200 or on the top of the panel 200.

The apertured heads 11, 12, 13 allow to easily fix and orientate the harnesses 100 because the cable ties 50 may rotate around the X and Z axes of the apertured heads 11, 12, 13, as shown by the arrows.

That is, the harnesses 100 can be easily oriented along the desired longitudinal axis L1 and L2. The residual stress is thereby limited. The manufacturing and mounting are facilitated. The harnesses 100 may be arranged in a crowdy environment with multiple orientations thanks to the clamp device 1.

Two harnesses 100 are represented in FIG. 1. The harness 100 on the left side of FIG. 1 is omitted, along with axis Y, for sake of clarity of the drawing, but may be attached to the apertured head 11, thereby allowing the fixation of three harnesses 100.

Figure 2:
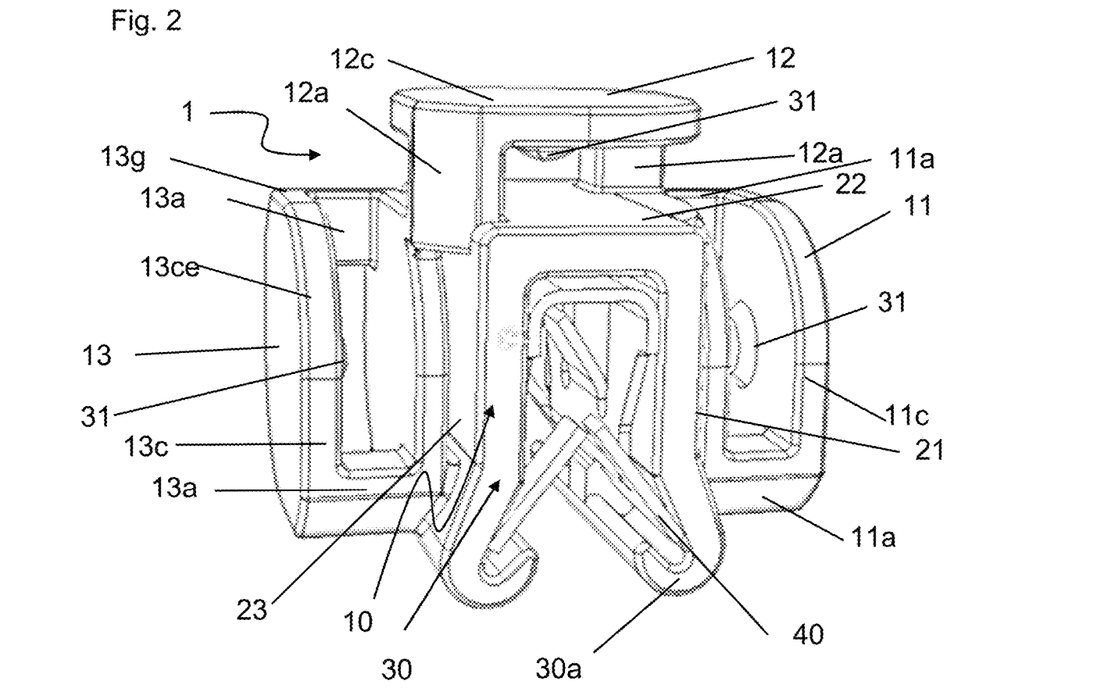
FIG. 2 shows the clamp device, in rear view.

FIG. 2 shows the clamp device 1, in rear view.

The body portion 10 has support sides comprising a top side 22, a first lateral side 21 and a second lateral side 23. That is, the a first apertured head 11 is on the first lateral side 21, the second apertured head 13 is on the second lateral side 23 and the third apertured head 12 is on the top side 22.

The first apertured head 11 has a (first) cap 11c and only two (first) pillars 11a so as to create or define a (first) space between the cap 11c, the two pillars 11a and the first lateral side 21 of the body portion 10. The cap 11c is linked to each of the two pillars 11a (the same applies for other caps 11c, 12c, 13c).

The first lateral side 21 and the second lateral side 23 may comprises a stepped surface 1011, 1013 to further limit the space and offer a better guiding for the introduction of the cable tie 50 in the space, as illustrated with reference to FIG. 6.

This applies also for the top side 22 which may comprises such stepped surface.

Similarly, the second apertured head 13 has a (second) cap 13c and only two (second) pillars 13a so as to create or define a (second) space between the cap 13c, the two pillars 13a and the second lateral side 23.

Similarly, the third apertured head 12 has a (third) cap 12c and only two (third) pillars 12a so as to create or define a (third) space between the cap 12c, the two pillars 12a and the top side 22.

The defined space allows for the introduction of the respective cable tie 50, and the cable tie 50 can be fixed to the respective harness 100 to attach it on the clamp device 1.

As each apertured head has only two pillars 11a, 12a, 13a, the cable tie 50 can rotate easily and the orientation of the harnesses can be improved greatly.

The apertured heads 11, 12, 13 may be provided with projections 31 or bosses, which allow to further facilitate the rotating adjustment of the cable ties 50.

The fixing portion 30 may receive therein the metal edge clip 40.

The fixing portion 30 may have a hook portion 30a to retain the metal edge clip 40.

Figure 3:
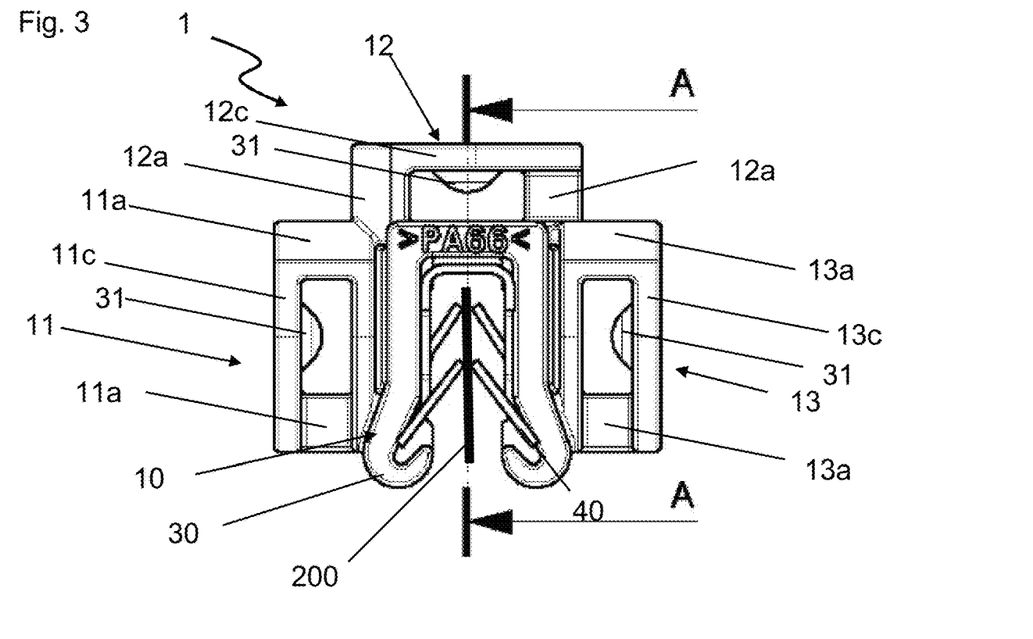
FIG. 3 shows the clamp device, in front view.

FIG. 3 shows the clamp device 1, in front view.

The reference numbers are kept as far as possible between the figures.

The panel 200 is introduced in the clamp device 1. To be more specific, the panel 200 is inserted inside the metal edge clip 40 and retained by lateral projections of the metal edge clip 40.

The position of the pillars 11a, 12a, 13a allows for the desired rotating adjustment, e.g. 90 degrees+/−5 degrees, or intermediate angles.

Figure 4:
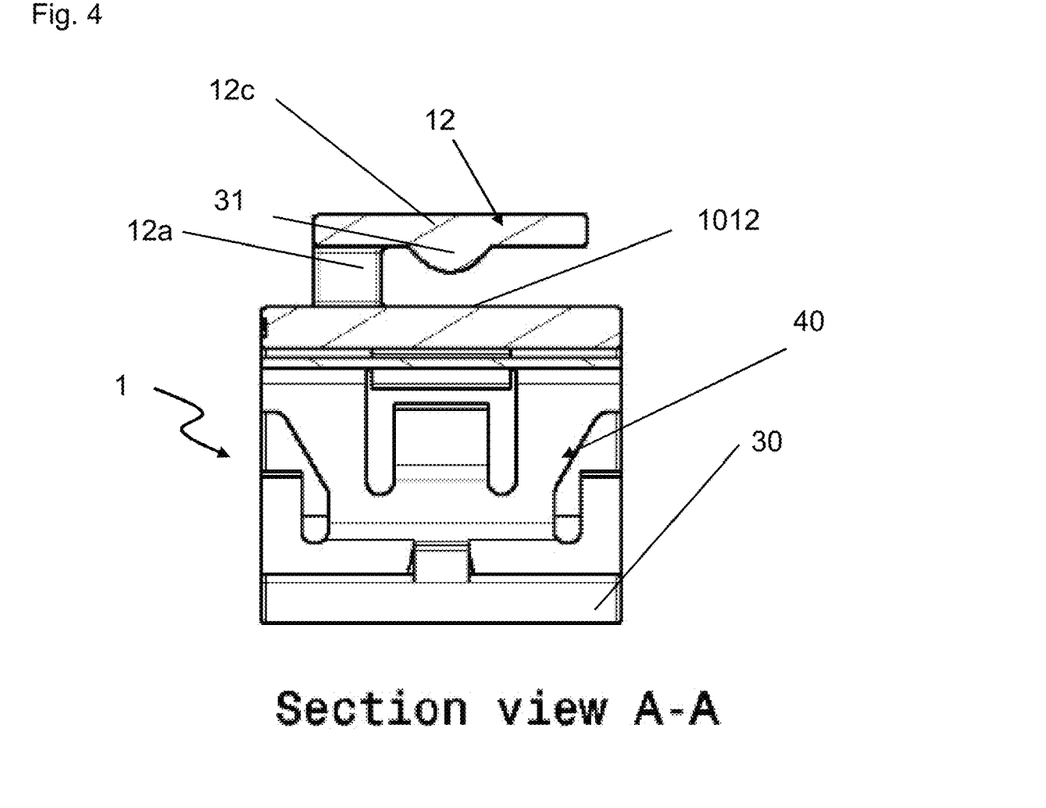
FIG. 4 shows the clamp device, in a section view A-A.

FIG. 4 shows the clamp device and the edge clip assembly, in a section view A-A, as placed in FIG. 3.

The reference numbers are kept as far as possible between the figures.

Figure 5:
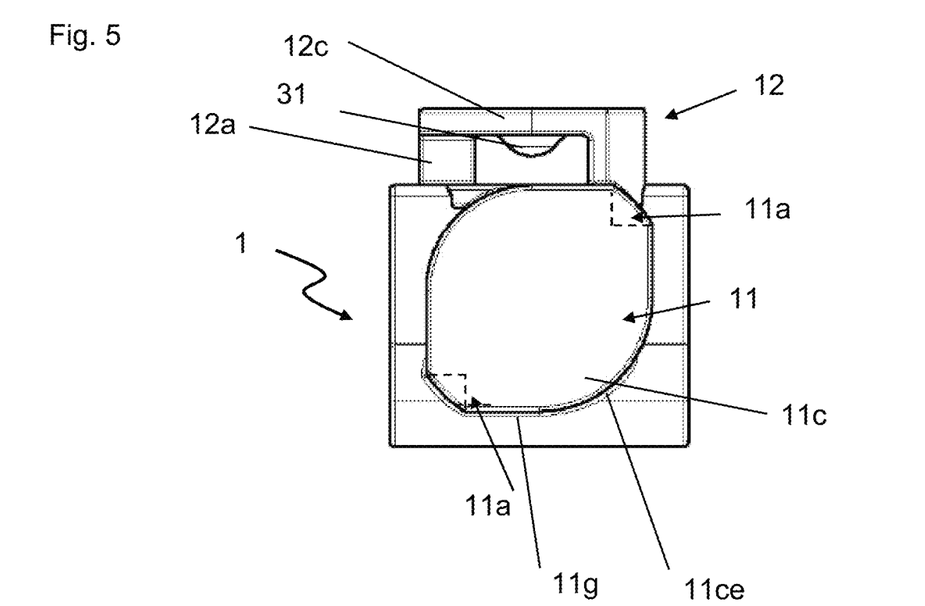
FIG. 5 shows the clamp device, in a side view.

FIG. 5 shows the clamp device 1, in a side view.

The pillars 11a are represented with dotted lines because they are hidden by the cap 11c.

The pillars 11a are placed at opposite corners of the cap 11c, which also apply for the other apertured heads 12, 13. This allows for improved rotatable adjustment of the cable tie 50, in particular to have a desired angle of rotation and the desired orientation of the harnesses 100.

Further, the pillars 11a, 12a, 13a may have a cross-sectional surface which is less than 5% of the surface of the cap, preferably less than 3%, more preferably less than 2%. This allows also for a better rotating adjustment.

Preferably, the caps 11c, 12c, 13c are fixed to the pillars 11a, 12a, 13a. Alternatively, the caps 11c, 12c, 13c can be movably connected to the pillars 11a, 12a, 13a.

Figure 6:
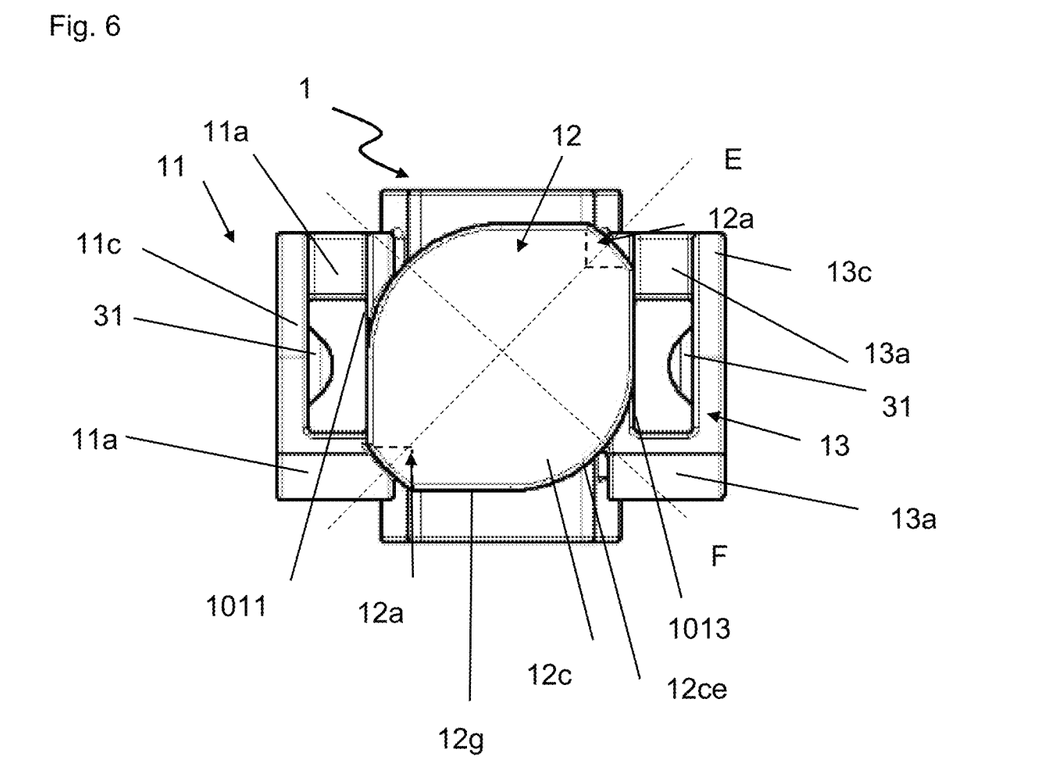
FIG. 6 shows the clamp device, in a top view.

FIG. 6 shows the clamp device 1, in a top view.

The stepped surfaces 1011, 1013 are represented in FIG. 6.

The pillars 12a are represented with dotted lines because they are hidden by the cap 12c.

The shape of the caps 11c, 12c, 13c may be as illustrated in the figures. That is, the cap 12c has an edge to edge axis E, and a perpendicular axis F for which there are no pillars. The cap 12c is longer in the edge to edge axis E than in the perpendicular axis F. This allows to have a better contact surface of the apertured head 12 with the corresponding harness 100. Further, a (slight) bending may occur on the smallest portion of the cap 12c along axis F, to allow for a better contact with the harness 100.

The pillars 11a, 12a, 13a have on their (internal) sides contact surfaces arranged to abut the cables ties 50 and thereby limit their extreme displacements. The contact surfaces, shown in dotted lines with respect to FIGS. 5 and 6, may be perpendicular to each other. Preferably, the contact surfaces are arranged with an angle of 45 degrees (preferably 45 degrees+/−5 degrees, more preferably 45 degrees+/−2 degrees) with respect to the edge to edge axis E. That is, preferably, when the cable tie 50 abuts the contact surface, the contact surface and a longitudinal direction of the cable tie 50 are locally parallel.

In addition, the caps 11c, 12c, 13c may each have curved edges 11ce, 12ce, 13ce on the perpendicular axis F so as to further facilitate the rotation of the cable ties 50 (also shown in FIG. 2 and FIG. 5).

Preferably, the curved edges 11ce, 12ce, 13ce are centrally disposed on the perpendicular axis F and the caps 11c, 12c, 13c have guiding portions 11g, 12g, 13g arranged between the curved edges 11ce, 12ce, 13ce and the pillars 11a, 12a, 13a so as to guide the cable ties 50 onto the pillars 11a, 12a, 13a. The guiding portions 11g, 12g, 13g also allow for an improved resting of the cables ties 50 when in abutment against the pillars 11a, 12a, 13a.

Preferably, the curved edges 11ce, 12ce, 13ce are arc shaped with a center of the arc at an intersection between the edge to edge axis E and the perpendicular axis F. The angle of the arc is preferably set to 80 degrees+/−5 degrees, or to 70 degrees+/−5 degrees or to 60 degrees+/−5 degrees, so as to facilitate the rotation of the cable ties 50.

It is also possible that only one desired cap 11c, 12c, 13c has the curved edges 11ce, 12ce, 13ce or on only one side of the perpendicular axis F.

Figure 7:
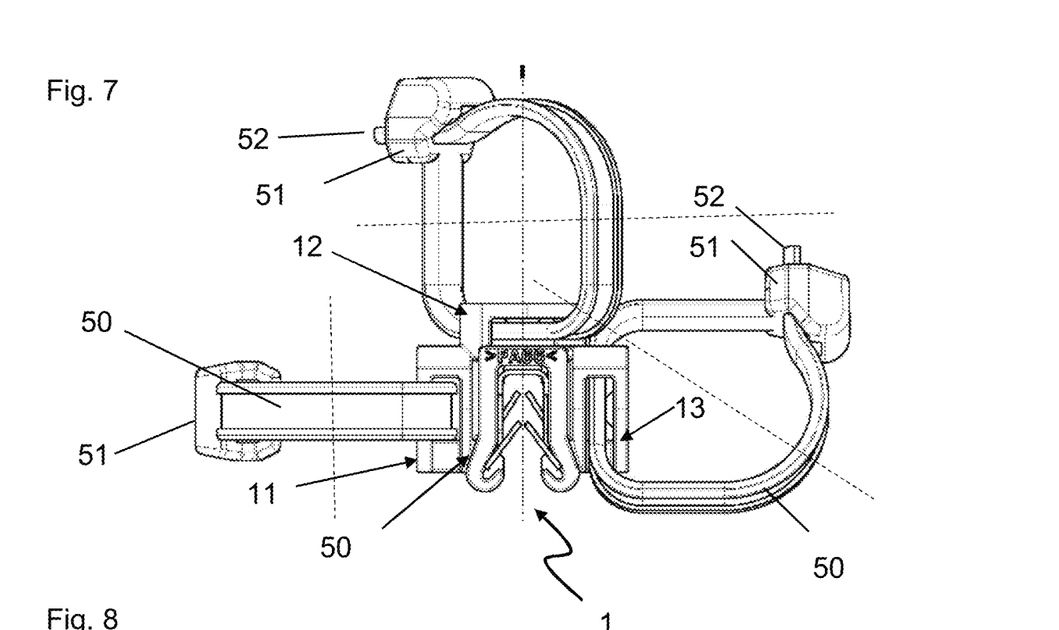
FIG. 7 shows the clamp device, in the front view, with the cable ties.

FIG. 7 shows the clamp device 1, in the front view, with the cable ties 50.

The reference numbers are kept as far as possible between the figures.

The clamp device 1 is represented with the cable ties 50.

The cable tie 50 has an end portion 52 which may be attached to an attachment portion 51, so as to maintain the respective harness 100.

Figure 8:
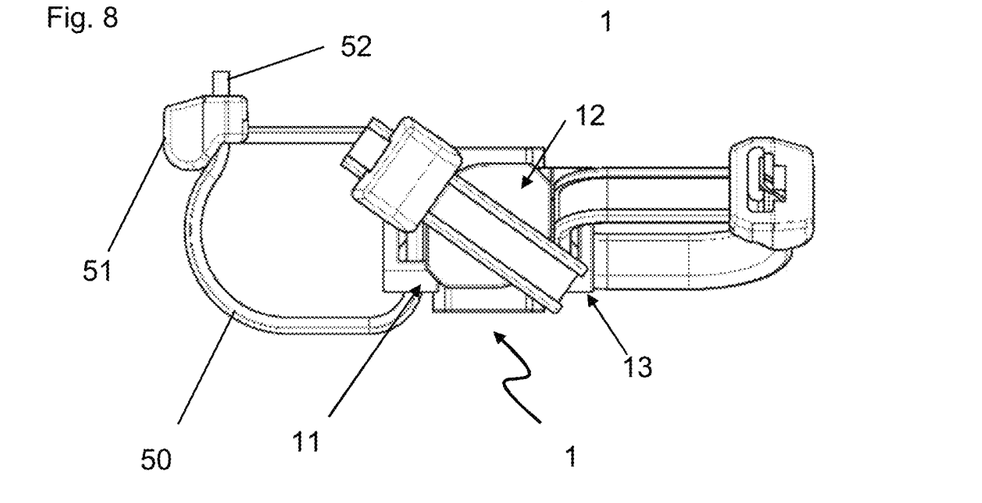
FIG. 8 shows the clamp device, in the top view, with the cable ties.

FIG. 8 shows the clamp device 1, in the top view, with the cable ties 50.

The reference numbers are kept as far as possible between the figures.

Figure 9:
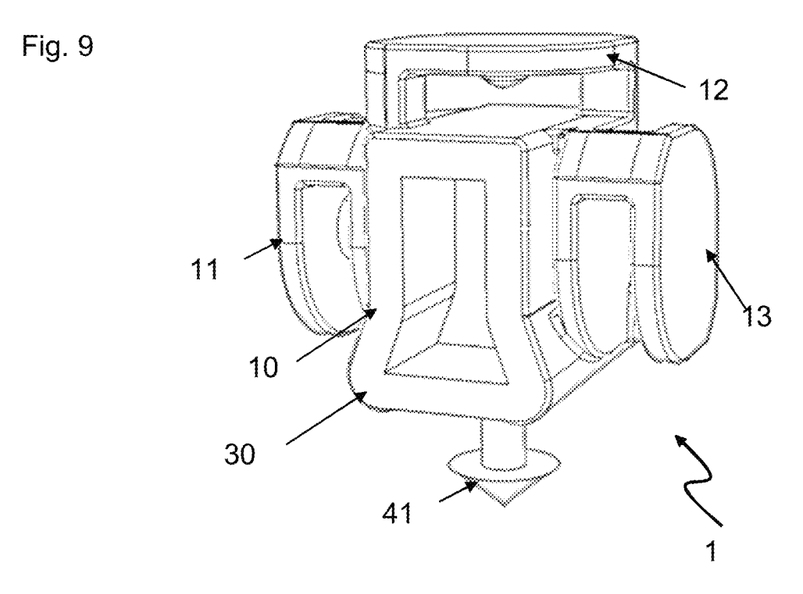
FIG. 9 shows the clamp device, in another embodiment, with a fir tree.

FIG. 9 shows the clamp device 1, in another embodiment, with a fir tree.

The clamp device 1 may include an anchor portion to as to be directly fixed on the panel 200. In the representation of FIG. 9, the clamp device 1 has a fir tree 41 to be fixed to a dedicated hole in the panel 200.

Generally speaking, the harness 100 may contain or overwrap one or more cables. The harness 100 may contain one or more cables, but it is also possible to attach the clamp device 1 onto one or more cables directly (that is to say, without the need of the harness 100, which applies for all the figures and embodiments).

The different embodiments can be combined whenever possible.

It will be understood that various modifications and/or improvements obvious to the person skilled in the art may be made to the various embodiments of the disclosure described in the present description without departing from the scope of the disclosure defined by the appended claims.

Unless context dictates otherwise, use herein of the word "or" may be considered use of an "inclusive or," or a term that permits inclusion or application of one or more items that are linked by the word "or" (e.g., a phrase "A or B" may be interpreted as permitting just "A," as permitting just "B," or as permitting both "A" and "B"). Also, as used herein, a phrase referring to "at least one of" a list of items refers to any combination of those items, including single members. For instance, "at least one of a, b, or c" can cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c, or any other ordering of a, b, and c). Further, items represented in the accompanying figures and terms discussed herein may be indicative of one or more items or terms, and thus reference may be made interchangeably to single or plural forms of the items and terms in this written description.

What is claimed is:

1. A clamp device comprising:
    a body portion having a fixing portion on a fixing side of the clamp device, arranged to be fixed to a panel, the body portion further has three support sides having a top side opposite to the fixing side, a first lateral side and a second lateral side; and
    a set of three apertured heads having a first apertured head on the first lateral side, a second apertured head on the second lateral side, and a third apertured head on the top side, each of the apertured heads comprising a cap and two pillars, the cap and two pillars arranged to create a space between the body portion, the cap, and the pillars to receive a respective cable tie arranged to attach one respective harness to the panel, so that the cable tie is allowed to rotate, thereby allowing up to three harnesses to be adjustably orientated at different angles to each other, the rotation matching with the orientation of the harness to be attached.

2. The clamp device of claim 1, wherein the two pillars are arranged to allow the respective cable tie to rotate by up to 90 degrees, including intermediate angles.

3. The clamp device of claim 1, wherein the two pillars are arranged to allow the respective cable tie to rotate by 90 to 120 degrees, including intermediate angles.

4. The clamp device of claim 1, wherein the two pillars are arranged to allow the respective cable tie to rotate by 45 to 90 degrees, including intermediate angles.

5. The clamp device of claim 1, wherein the fixing portion is arranged to receive a metal edge clip assembled therewith.

6. The clamp device of claim 5, further comprising:
    the metal edge clip.

7. The clamp device of claim 5, wherein the metal edge clip is overmolded onto the fixing portion.

8. The clamp device of claim 1, wherein the fixing portion is arranged to receive a metal edge clip overmolded thereto.

9. The clamp device of claim 8, further comprising the metal edge clip.

10. The clamp device of claim 8, wherein the metal edge clip is overmolded onto the fixing portion.

11. The clamp device of claim 1, wherein the fixing portion further comprises at least one of:
    an anchor;
    a threaded portion;
    a fir tree; or
    a head.

12. The clamp device of claim 1, wherein at least one of the caps further comprises:
    a projection projecting toward the fixing portion.

13. The clamp device of claim 1, wherein the body portion and set of three apertured heads are integrally formed.

14. The clamp device of claim 1, wherein at least one pillar of the first apertured head is aligned with at least one pillar of the second apertured head.

15. The clamp device of claim 1, wherein the pillars are provided at corners of their respective caps.

16. The clamp device of claim 15, wherein the pillars are arranged at opposite corners of the cap.

17. The clamp device of claim 1, wherein at least one pillar of the first apertured head and at least one pillar of the second apertured head are not aligned.

18. The clamp device of claim 1, wherein the pillars are cylindrical.

19. The clamp device of claim 1, wherein the pillars are in a columnar shape.

20. The clamp device of claim 1, wherein the cap of at least one of the apertured heads has a cap surface, the two respective pillars have a cross section surface, and the cross section surface is less than 5% of the surface of the cap.

21. A clamp device comprising:
    a body portion having a fixing portion on a fixing side of the clamp device, arranged to be fixed to a panel, the body portion further has three support sides having a top side opposite to the fixing side, a first lateral side and a second lateral side; and
    a set of three apertured heads having a first apertured head on the first lateral side, a second apertured head on the second lateral side, and a third apertured head on the top side, each of the apertured heads comprising a cap and only two pillars, the cap and two pillars arranged to create a space between the body portion, the cap, and the pillars to receive a respective cable tie arranged to attach one respective harness to the panel.

* * * * *